Figure 1:
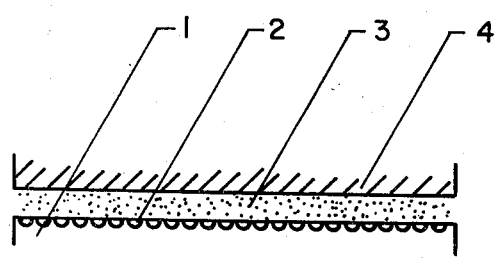

United States Patent

Knapp

[11] 3,852,151
[45] Dec. 3, 1974

[54] POLYESTER-METAL LAMINATES

[75] Inventor: Erich Knapp, Kufstein/Tirol, Austria

[73] Assignee: Ciba-Geigy A-G, Basel, Switzerland

[22] Filed: Mar. 30, 1972

[21] Appl. No.: 239,724

[30] Foreign Application Priority Data
Apr. 2, 1971   Austria .............................. 2832/71

[52] U.S. Cl............. 161/162, 117/47 R, 117/47 A, 161/146, 161/164, 161/165, 161/185, 161/214, 161/231
[51] Int. Cl............................................. B32b 5/16
[58] Field of Search .......... 161/162, 146, 214, 165, 161/164, 185, 231, 186, 194, 168; 117/47 R, 47 A

[56] References Cited
UNITED STATES PATENTS

| | | | |
|---|---|---|---|
| 2,909,443 | 10/1959 | Wolinski | 161/231 |
| 2,955,973 | 10/1960 | Smith | 161/189 |
| 3,101,275 | 8/1963 | Cairns | 117/47 A |
| 3,365,355 | 1/1968 | Netsch | 161/189 |
| 3,380,876 | 4/1968 | Rusher | 161/162 |
| 3,607,354 | 9/1971 | Krogh | 117/47 R |

Primary Examiner—George F. Lesmes
Assistant Examiner—Ellis Phillip Robinson

[57] ABSTRACT

Laminates of one of more layers of a saturated thermoplastic polyester, one or more continuous metal layers and one or more adhesive layers, wherein the polyester layer is coated on at least one of its bonding surfaces with an additional layer of metal, glass, mineral or ceramic particles of 10 to 100 microns in size.

2 Claims, 2 Drawing Figures

PATENTED DEC 3 1974　　3,852,151

POLYESTER-METAL LAMINATES

There is a market demand for hard, breakage resistant laminates formed with a layer of synthetic polymeric material of 0.3 mm to 100 mm in thickness. In the commonest form they consist of a solid substrate and a layer of synthetic polymeric material bonded together by an adhesive layer. They may be designed for further use as pre-fabricated laminated materials, though many are produced by bonding synthetic polymers to the surface of solid substrates which form the component parts of a final article of use.

The present invention relates to polyester-metal laminates which are used as industrial materials and to a process for bonding flat polyester mouldings of 0.3 mm to 100 mm thickness to substrates.

When produced as industrial materials the said polyester-metal laminates are mainly used in machine and aircraft construction, in building and in the manufacture of sports goods such as skis.

The said process is employed for bonding semifabricated synthetic polymer products, for example sheeting of 0.3 to 0.5 mm thickness, panelling of 0.5 to 20 mm thickness as well as blocks of greater thickness, to the surface of metal substrates.

As industrial materials, thermoplastic polyesters with melting points of at least 200°C are known to have excellent mechanical properties, for example hardness, tensile strength, gliding properties, dimensional stability and low water adsorption, with constancy in these properties under varying climatic conditions. But in spite of these merits wide areas of use are closed to thermoplastic polyesters because their surfaces cannot be satisfactorily bonded to other materials.

Polyester-metal laminates are known which consist of a layer of polyester, a continuous layer of metal and a film of adhesive between the polyester and the metal. As the polyester has low power of adhesion its surface has to be treated with an agent for increasing its surface activity, said agent being removed before the polyester is bonded to the continuous metal layer. Agent causing chemical decomposition of the polyester are generally used, for example acids and lye solutions.

Belgian Pat. No. 731,652, for instance, recommends prior treatment of the polyester with aqueous alkali hydroxide solutions. Although polyester-metal laminates produced in accordance with the teaching of this patent show better resistance to peeling than comparable untreated products, but still insufficient for many end uses.

In French Pat. No. 1,542,646 the use of cast polymer films to produce laminates impermeable to gases is proposed. These systems consist of one or more films of up to 0.075 mm thickness cast successively on the substrate. The substrate may be glass, metal, wood or moulded plastic products. The impermeability by gases is obtained by using lamelliform or scale-like material with a size range of up to 20 microns in length and up to 1.5 microns in width, which is either mixed with the polymer before film casting or applied to one of the inner polymer films of the laminate. This anisotropic lamelliform or scaly material may be, for example, metal, mineral, graphite or an organic compound. Before use in the process the finely divided material has to be carefully purified and the coarse size fractions removed; sometimes a chemical pre-treatment is necessary.

Since these laminates built up with very thin cast films are used as packaging material they must be easily strippable from the substrate after use. Consequently the question of the permanent bonding of thick polymer layers to metal layers is not touched upon in the said patent.

United States Pat. No. 3,380,876, on the other hand, is concerned with the bonding of thin thermoplastic films of up to 25.4 microns thickness to substrates such as paper, cardboard, glass, wood, thermoplasts, metal and metal alloys. To improve the adhesive power between the thermoplast and the substrate, the latter is coated with an adhesive combination of colloidal silica and an organic additive selected from the group consisting of polyethylene glycol, tertiary dodecyl thioethers, polyoxyethylene sorbitan monolaurate and polyethylene oxide polymers. Amounts of 0.01 to 0.08 pounds colloidal silica per 1000 square feet of the substrate surface are applied. Using silicic acid brine, the size of the colloidal $SiO_2$ particles should be less than 100 millimicrons. In the adhesive film, however, the $SiO_2$ particles may aggregate to form larger particles; the aggregated $SiO_2$ particles are a constituent of the adhesive film. In the absence of the organic additive the thin thermoplastic film and the substrate adhere to each other, but the adhesion is greatly improved by the organic additive.

For improving the adhesion of moulded "Teflon" components, U.S. Pat. No. 3,365,355 suggests the admixture to Teflon powder of 15–70 weight percent of ground glass fibre having a particle size range of 0.395 to 1.58 millimetres, with subsequent pressure sintering of the mixture to give a moulded component. Pressure sintering is carried out so that a moulded part is obtained having at least one surface encrusted with glass powder and at least one surface free from the powder. The surface encrusted with glass powder can be bonded to metal, glass-filled Teflon, wood or other polymers. The proposed process is time- and labour-consuming, and a high proportion of the incorporated glass powder, being in the interior of the moulding, does not contribute to the improvement of adhesion. Apart from this, the incorporation of large amounts of glass powder causes undesirable changes in the mechanical properties of the polymer. Notably the laminates show increased brittleness and have lower breaking elongation values. For the production of high strength polyester films with low electrical surface resistance, it is suggested in the published Austrian Patent Application No. 8516/68 that a solvent or swelling agent should be allowed to act upon one or both surfaces of strechted polyester film, very small electrically conductive particles, preferably carbon black or metal particles deposited on the treated surface in amounts of 0.10 to 5 grams per square metre, and the film submitted to heat treatment. On completion of the process the finely divided particles are embedded in the surface of the polyester and resist removal over a long period of time, even when subjected to rubbing. Although nothing is said of the size range of the particles, they are termed pigments.

The problem of bonding polyester films or thicker mouldings is not referred to in this application. If an attempt is made to bond to a continuous metal surface the described polyester films carrying embedded, electrically conductive fine particles, the resulting laminate is found to have an insufficient resistance to peeling.

The present invention relates to polyester-metal laminates which have superior peeling resistance to the known polyester-metal laminates. The invention comprises further a process for bonding polyester and continuous metal sheet to form the said laminates, which are free from the aforementioned draw-backs. Using the disclosed process, polyester laminates can be bonded to a continuous metal surface with fully satisfactory results. The principle of the said laminates and the bonding process used for their production is employed, for example, when polyester laminates of large surface area have to be bonded to continuous metal sheet or foil to meet high mechanical strength properties.

The laminate system according to this invention consists of one or more layers each of 0.3 to 100 mm thickness of a saturated thermoplastic polyester having a melting point not lower than 200°C and one or more continuous metal layers of any desired thickness bonded to the polyester layer, and an adhesive layer between them consisting of an adhesive for metal, the distinctive feature of the said laminate system being that the polyester at least one of its bonding surfaces is coated additionally with a discontinuous adhesive layer of metal, glass, mineral or ceramic spherical particles of 10 to 100 microns in diameter. This additional layer is applied in amounts of 10 to 300, preferably 50 to 200 or more especially 100 to 200 grams per square metre of the polyester surface.

The coating charge for iron powder is 40–300 g/m$^2$, more especially 50–200 g/m$^2$ and preferably 100–200 g/m$^2$. The corresponding values for aluminium are 20–100 g/m$^2$, 25–70 g/m$^2$ and 30–70 g/m$^2$. For glass and ceramic powders the values are 10–100 g/m$^2$, more especially 15–60 g/m$^2$ and preferably 30–60 g/m$^2$.

The thermoplastic polyesters with a melting point of at least 200°C can be produced from acid and diol components by the known processes described in U.S. Pat. No. 2,465,319.

The acid components are selected with advantage from aromatic dicarboxylic acids, in particular difunctional acids, which contain 1 or 2 benzene rings and 8 to 20 carbon atoms, or their lower dialkyl esters whose alkyl radicals contain 1 to 4 carbon atoms. Specially preferred acid components are terephthalic, isophthalic, naphthalene-(2,6)-dicarboxylic and diphenyldicarboxylic acids. Difunctional aliphatic dicarboxylic acids containing 4 to 10 carbon atoms and their lower dialkyl esters can also be used. The preferred aliphatic dicarboxylic acids are adipic, sebacic and azelaic acid. Polyesters of high melting point with notably good mechanical properties are obtained when at least 85 weight percent of the acid component consists of terephthalic acid or its lower dialkyl esters. The alcohol components used are difunctional alkane diols containing 2 to 10 carbon atoms, 1,4-bis-(hydroxymethyl)-cyclohexane and 2,2-bis-(4'-β-hydroxyethoxyphenyl)-propane. Linear polyesters are formed when these difunctional components are used. In addition, small amounts (0.01 to 1 Mol. % relative to the acid component) of more than divalent components with branching and cross-linking action (polyfunctional carboxylic acids, alcohols, hydroxy-carboxylic acids) can be used. Examples of these components are glycerine, erythrite, pentaerythrite, tricarballylic acid, trimellitic acid, dihydroxybenzoic acid and racemic acid.

For a polyester-metal laminate exhibiting particularly good resistance to peeling, the adhesion-reinforcing layer consists of one to three coats of metal, glass, mineral or ceramic powder. Laminates built up according to this system have a minimum resistance to peeling of 1.20 (kp × m)/mm when measured as specified in German Industrial Standard 53289. This applies for a peeling cylinder which differs from the standard type in having an internal radius of 65 mm and an external radius of 75 mm. If the peeling resistance is tested with a cylinder of 30 mm internal and 40 mm external radius, the value for the peeling resistance is 8(kp × mm)/mm at least.

Figure 2:
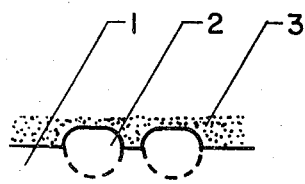

FIG. 1, is a cross-sectional view of the structure of such a polyester-metal laminate, which does not however impose any limitation on the invention. The illustration shows the polyester layer 1 and the adhesion-reinforcing layer 2 of metal, glass, mineral or ceramic particles, which is in part swollen into or embedded in the polyester. The part of this layer protuding above the polyester surface can be buffed or ground down with emery paper (FIG. 2 shows the structural features in greater detail). The layer reinforcing the adhesive power is covered by the adhesive layer proper 3, the function of which is to bond the polyester to the continuous metal surface 4.

It has been found that these polyester-metal laminates can be produced with a resistance to peeling which is high enough to satisfy the specifications for numerous end-uses when 40 to 300 grams per square metre of metal, glass, ceramic or mineral particles of 10 to 100 microns in size are deposited on the polyester surface, embedded in it to form an adhesion-reinforcing layer, and a metal adhesive applied on this layer, after which the polyester and the continuous metal surface are bonded together. Thus the process does not simply involve bonding polyester film coated with pigment particles to a continuous metal sheet as taught in the published Austrian Patent Application No. 8516/68, since, as stated, polyester films so treated and bonded to metal do not form laminates showing adequate resistance to peeling.

In the bonding process of this invention the discontinuous layer which reinforces the adhesion is formed by depositing on the polyester a suitable material in pulverized or particulated form. The size distribution range of the powder of particles must come within the limit values of 10 and 100 microns, preferably 50 and 100 microns. They can be applied, for example, by spraying with compressed air, or via the liquid phase by mechanical application of suspension formed by suspending the powder or particles in a suitable solvent, or in the solid phase by direct sieving on to the polyester surface. The pulverized or particulated material is embedded in the polyester surface preferably by migration assisted by the action of a swelling agent, or alternatively by the application of pressure and heat, e.g. by impressing or melting the powder or particles into the polyester by means of a supersonic field. The appropriate adhesive is applied on this layer. If the discontinuous adhesion-reinforcing layer is of metal, one of the normal metal-metal adhesives is used, if it is of glass one of the normal metal-glass adhesives, etc. Bonding is carried out by one of the known methods with the use of pressure and heat.

Before the powder is applied it is screened so that the major proportion is in the size range of 10 to 100 microns. The preferred metal powders are manganese, iron, aluminium, copper, nickel, chromium, bismuth, tin, magnesium, and alloys of these such as brass, bronze and antimony-lead. Glass is generally used in the form of powder or spherules from 50 to 100 microns in size. Of the minerals, corundum, gypsum, calcite, china clay or one of the silicates may be used, and of the ceramic materials ground clay.

Although it is not absolutely necessary to raise the polyester surface, this is advisable and can be done by buffing with emery paper, e.g. of 60 microns grain. It is not always necessary to degrease the polyester unless it is heavily contaminated with fats or greases, which can be removed with, for example, acetone or a hydrocarbon.

In a preferred mode of operation of the process, samples of the polyester are swollen on the bonding side by a solvent with limited dissolving power for polyesters. The powder is sieved on to this side of the polyester. The samples are then heated at about 100 to 150°C in a drying oven or by a suitable heat source, e.g. an infra-red radiater, and dried to eliminate the solvent. Drying times of up to 10 minutes or preferably up to 6 minutes are advisable. Alternatively the solvent can be removed by exposure for 30 seconds to 2 minutes in dry heat at 200–300°C. This treatment results in good adhesion and anchoring of the powder in the polyester surface. For particularly high quality bonding, the powder is pressed into the polyester under a load of up to 30 $kp/cm^2$.

If the discontinuous powder layers are of very limited thickness the uppermost layer needs not be ground down, but is advisable for thicker layers.

The swelling agent can be chosen from the phenols, the dihydroxy- or trihydroxy-benzenes, halogenated hydrocarbons, halogenated lower fatty acids, etc.

In one operational form of the process the powder is applied in suspension in the swelling agent at 50 to 100°C, e.g. iron or manganese powder in phenol:tetrachlorethane 1:1. The further procedure is as described in the foregoing.

Another possible variation is to apply the powder without the use of a swelling agent and to melt it in the polyester surface by flaming, infra-red irradiation or supersonic wave action. If a ferromagnetic powder is used it can be melted in the polyester by applying a high frequency field.

The adhesive is applied on the coated polyester surface. If the coat is of metal powder, a standard metal adhesive is employed, e.g. an epoxide resin with binder (binder: hardener ratio 100:40 to 100:80 ) or a polyurethane or cyanacrylate based adhesive. Depending on the nature of the adhesive, bonding is carried out under specific time, temperature and pressure conditions. For epoxide resin adhesives the hardening temperatures are from room temperature to about 120°C. The pressure is of the order of 10 $kp/cm^2$ and the times vary in relation to the temperature. The adhesive is applied in amounts of about 200 grams per square metre of the bonding surface.

Polyester-metal laminates produced in conformity with the process disclosed herein show around 20 % higher resistance to peeling than polyester-metal laminates produced by bonding a polyester layer treated with caustic soda solution to a continuous sheet of metal. In comparison with laminates produced by bonding a polyester layer treated with a swelling agent (phenol:tetrachlorethane 1:1) to sheet metal, their superiority in peeling resistance is in the region of 50 %. Thus the swelling of the polyester has no effect on the bonding strength.

The bonding process described herein can of course be carried out continuously if desired.

The following Examples illustrate the invention without limiting its scope.

EXAMPLE 1

A polyethylene terephthalate sheet measuring 290 × 70 mm × 1 mm thickness is brush coated on one side with a 1:1 solution of phenol:tetrachlorethane heated to 60°C. Iron powder with the major size fraction of 10–90 microns is sieved on to the coated side, the sheet heat treated in a drying oven for 5 minutes at 150°C, placed while hot in a hydraulic press and pressed at 30 $kp/cm^2$, then heated by infra-red radiation to 200–300°C (in the radiation field) for 2 minutes, and allowed to cool. The topmost metal powder layer is buffed with emery paper to leave the polyester with a 100 $g/m^2$ powder coating. Finally a thin film of a two-component epoxide adhesive (binder:hardener ratio 100:80 ) is applied. Thus prepared, the polyester is bonded to aluminium foil mordanted with chromosulphuric acid for 10 minutes at 120°C and 10 $kp/cm^2$ pressure.

Five of the polyester-aluminium laminates thus produced have an average value of 1.35(kp × mm)/mm for resistance to peeling in the test specified in German Industrial Standard 53289, using a non-standard peeling cylinder with an inner radius of 65 mm and an external radius of 75 mm.

EXAMPLE 2

A polyethylene terephthalate sheet with the dimensions 179 × 15 × 1 mm is brush coated on one side with a 1:1 solution of phenol:tetrachlorethane at 60°C. Glass powder with a particle size range of 20–90 microns is sieved on to the treated side. The sheet is treated for 6 minutes at 150°C in a drying oven and then placed on a hydraulic press, where the glass layer is pressed into the polyester at 30 $kp/cm^2$ pressure. The sheet is heated with an infra-red radiator for 2 minutes to 200 to 300°C (in the field of radiation). After it has cooled the uppermost glass layer is buffed off with emery paper. A two-component epoxide adhesive (binder:hardener ratio 100:80) is applied as a thin film. The prepared side of the polyester is bonded to aluminium foil mordanted with chromosulphuric acid for 10 minutes at 120°C and 10 $kp/cm^2$ pressure.

Five of the polyester-aluminium laminates produced have an average value of 8(kp × mm)/mm for resistance to peeling in the test specified in German Industrial Standard 53289 when a non-standard peeling cylinder is used having an internal radius of 30 mm and an external radius of 40 mm.

Comparably good results are obtained when ground clay or china clay with a size distribution range of 50 to 100 microns is used in place of glass powder.

Having thus disclosed the invention, What I claim is:

1. A laminate comprising one or more layers each of 0.3 to 100 mm thickness of a saturated thermoplastic polyester with a melting point not lower than 200°C, one or more continuous metal layers each bonded by an adhesive layer to said polyester layer, which laminates are characterized by the polyester layer having imbedded on at least one of its bonding surfaces with an additional discontinuous layer imparting greater adhesive power wherein said discontinuous layer is a material selected from the group consisting of manganese, iron, aluminum, copper, nickel, chromium, bismuth, tin, magnesium, brass, bronze, antimony-lead, corundum, gypsum, calcite, clay, and silicate, particles of 10 to 100 microns in size applied in amounts of 10 to 300 grams per square meter of the polyester bonding surface.

2. Laminates according to claim 1, wherein the layer imparting greater adhesive power consists of a metal selected from the group consisting of iron, manganese, aluminium, copper, nickel, chromium, bismuth, tin and magnesium.

* * * * *